(12) United States Patent
Klar

(10) Patent No.: US 6,957,824 B2
(45) Date of Patent: Oct. 25, 2005

(54) INTERLOCKING DEVICE

(75) Inventor: Kenneth J. Klar, Portland, OR (US)

(73) Assignee: Jerry A. Edwards, Portland, OR (US)

(*) Notice: Subject to any disclaimer, the term of this patent is extended or adjusted under 35 U.S.C. 154(b) by 238 days.

(21) Appl. No.: 10/198,671

(22) Filed: Jul. 15, 2002

(65) Prior Publication Data
US 2004/0007853 A1 Jan. 15, 2004

(51) Int. Cl.⁷ ............................................. B60D 1/167
(52) U.S. Cl. .................. 280/482; 280/491.2; 280/491.1
(58) Field of Search ...................... 280/456.1, 482–484, 280/491.1–491.2, 492, 493, 500

(56) References Cited

U.S. PATENT DOCUMENTS

| | | | |
|---|---|---|---|
| 1,435,064 A | 11/1922 | Holmes | 280/483 |
| 4,029,279 A | 6/1977 | Nakatani | 248/188.5 |
| 4,430,017 A | 2/1984 | Stefancich | 403/104 |
| 4,761,092 A | 8/1988 | Nakatani | 403/104 |
| 5,035,527 A | 7/1991 | Cheng | 403/109 |
| 5,154,449 A | 10/1992 | Suei-Long | 285/298 |
| 5,382,042 A | 1/1995 | McPhee et al. | 280/477 |
| 5,462,338 A | 10/1995 | Baumann | 297/411.37 |
| 5,537,890 A | 7/1996 | Thomas | 74/493 |
| 5,915,715 A | 6/1999 | Ford | 280/494 |
| 5,957,477 A | 9/1999 | Ensz et al. | 280/482 |
| 6,168,182 B1 | 1/2001 | Ford | 280/494 |
| 6,352,278 B1 * | 3/2002 | Solberg | 280/482 |

* cited by examiner

Primary Examiner—Lesley D. Morris
Assistant Examiner—L. Lum
(74) Attorney, Agent, or Firm—Ian F. Burns

(57) ABSTRACT

The specification discloses several embodiments of an interlocking device. The specification discloses a preferred embodiment of an interlocking device having an inner bar slideable within the confines of an outer bar. The outer bar has a first end and a second end. When the inner bar slides towards the second end of the outer bar, a plug, which is attached to the inner bar, is adapted to abut a plug barrier thereby preventing the inner bar from sliding towards the second end.

The outer bar of the interlocking device further defines an interlocking member passage and an interlocking member stop. The interlocking device further has an interlocking member attached to the inner bar. When the inner bar slides towards the first end of the outer bar, at least a portion of the interlocking member moves transverse to the sliding axis of the inner bar and into the interlocking member passage. The interlocking locking member further abuts the interlocking member stop, thereby stopping the inner bar from sliding towards the first end of the outer bar. The interlocking device preferably has a cam attached to the outer bar and adjacent to the interlocking member stop. The cam may be actuated to release the interlocking member from the interlocking member stop thereby allowing the inner bar to slide through the confines of the outer bar.

45 Claims, 5 Drawing Sheets

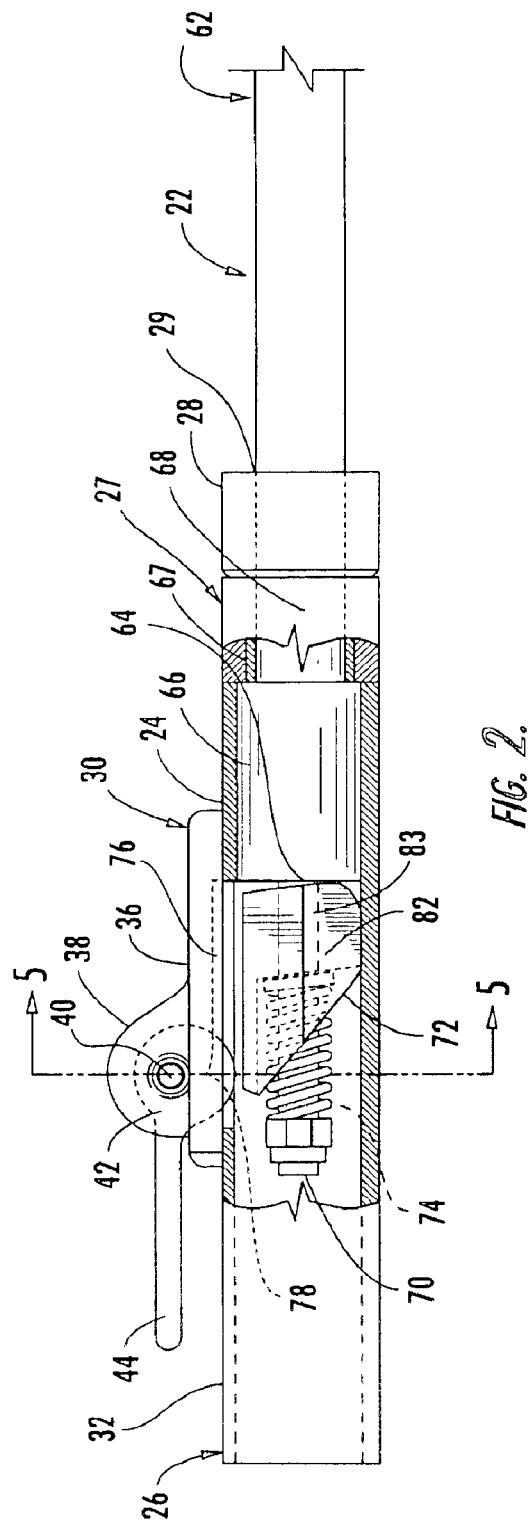
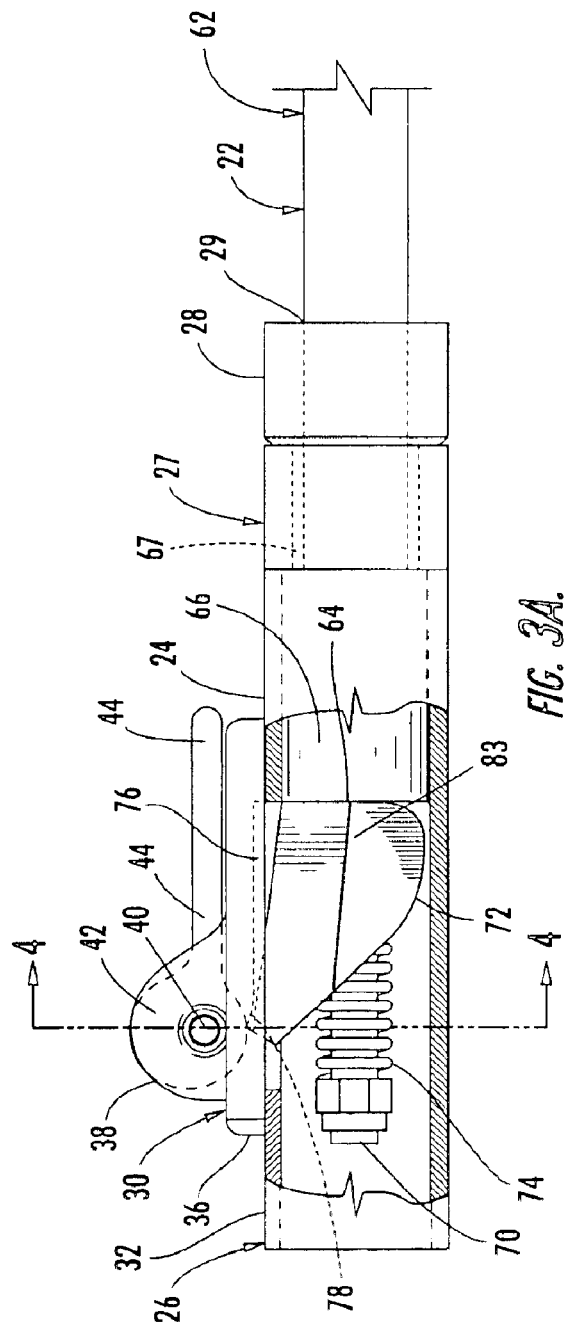

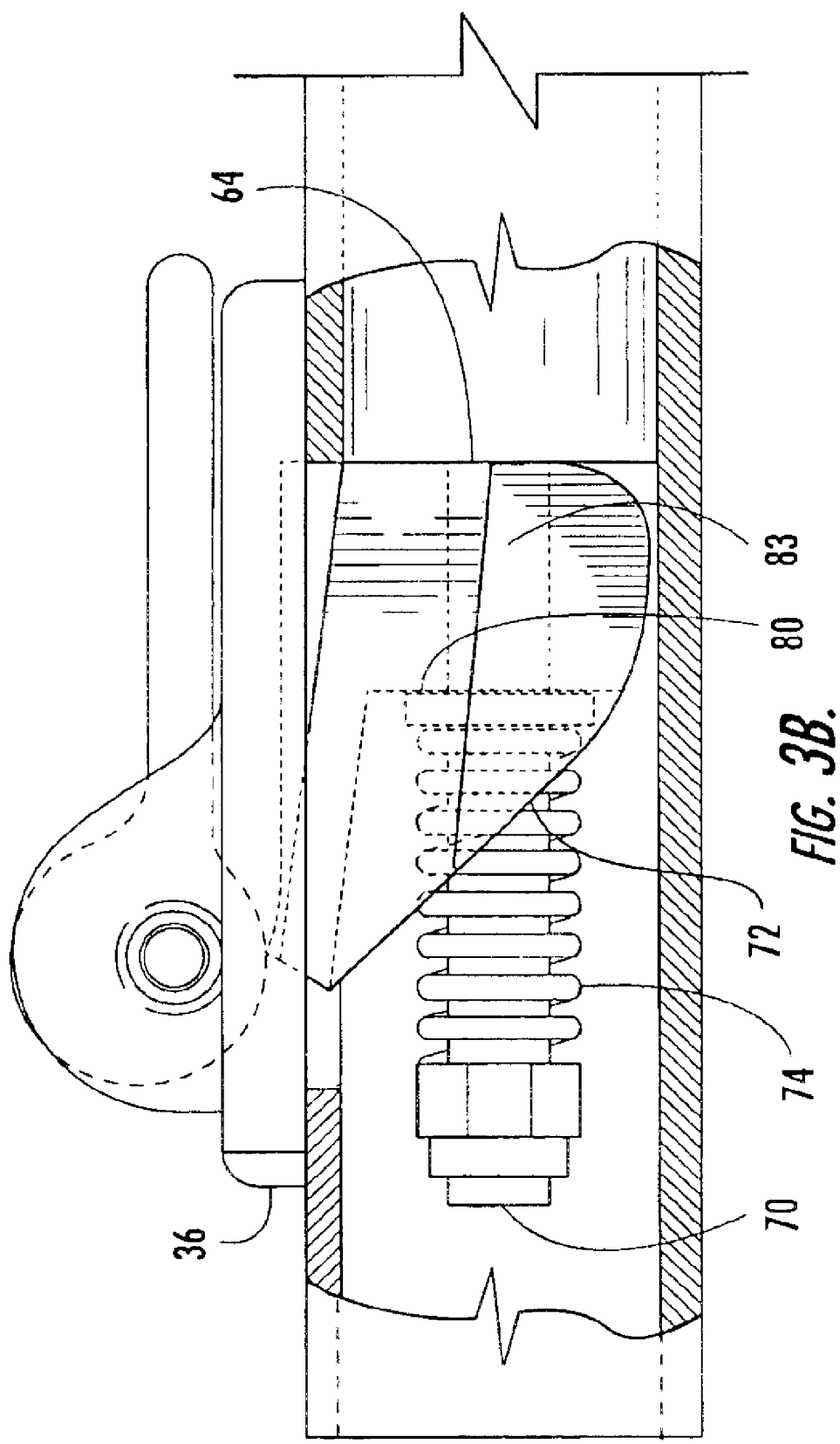

INTERLOCKING DEVICE

FIELD OF INVENTION

The present invention relates to locks and fasteners. More particularly, the present invention relates to locks that mechanically interlock an inner member from sliding within the confines of an outer member.

BACKGROUND

Inner-Outer Member Combination

Various devices presently utilize inner members that are slidable within the confines of outer members (also referred to as "inner-outer member combination"). An inner-outer member combination allows a user to adjust a device's dimension. For example, some tow bars used for towing vehicles have legs that utilize the inner-outer member combination so that they can easily be stored when not in use. Camera tripods also utilize the inner-outer member combination so that they can be stored in a non-bulky manner.

Other devices that utilize the inner-outer member combination include: cleaning poles that allow users to extend the poles to reach a desired height and construction devices that extend to a certain height to transport and allow a person to work on an elevated area, such as billboards. The inner and outer members of these devices may have the same shape, but vary in diameter—that is, telescopic.

Locking Mechanism for Telescoping Legs

Telescoping legs are used in cleaning or agricultural tools (as disclosed in U.S. Pat. No. 5,154,449), legs of common camera tripods (as disclosed in U.S. Pat. Nos. 4,029,279 and 4,761,092), and musical instrument support (as disclosed in U.S. Pat. No. 4,430,017). All of these telescoping legs have a locking mechanism that stops the inner bar from sliding within the confines of the outer bar.

U.S. Pat. No. 5,154,449 discloses a lock for telescoping legs. The lock has a cylindrical clamp, a movable block, and an eccentric shield. The cylindrical clamp is actuated by pivoting the eccentric shield, which causes the shield to pinch the clamp to secure the outer tube and to press the movable block against the outer tube. See also U.S. Pat. No. 4,761,092.

U.S. Pat. No. 4,029,279 discloses another lock for telescoping tubular legs. The lock has a camming lever that engages an inner channel section through a window formed in the outer channel section, thereby locking the inner and outer members. See also U.S. Pat. No. 4,430,017.

One problem with the locks described above is that they are friction-based locks. Friction-based locks rely on friction to prevent an inner member from sliding within the confines of an outer member. However, friction may be overcome by a strong force. Thus, friction-based locks may only be appropriate for limited applications, such as when telescoping legs are used to support lightweight objects or when telescoping legs are not subjected to strong forces. Friction-based locks are also disclosed in U.S. Pat. Nos. 4,029,279, 4,761,092, and 4,430,017.

Tow Bars

Tow bars are devices used for enabling a carrier to tow another carrier. Tow bars are commonly used for enabling a recreational vehicle (an "RV") to tow a car. Tow bars typically have a pair of legs attached to a leg coupler. The leg coupler attaches to a hitch or a ball mount of the towing vehicle. The other end of the tow bar legs attaches to the vehicle being towed.

A sample tow bar is disclosed in U.S. Pat. No. 5,382,042 ('042 reference), entitled "Towing Device Support." The tow bar of the '042 reference has a cylindrical inner member that moves in two directions within a cylindrical outer member. In one embodiment, the cylindrical outer member has a latch attached to one end of the cylindrical outer member. The latch has a handle on one end and a stopping potion and a tooth on another end. The tooth is adapted to abut a dimple on the inner bar. The dimple is substantially a triangular shaped indentation on the inner bar. The tooth of the latch is adapted to go inside the indentation and abut the bottom of the dimple's triangle thereby preventing the inner bar from sliding toward the bottom triangle side. However, the inner member can still move in the opposite direction because the tooth can disengage from the dimple by sliding toward the crest of the dimple's triangle, as there is no structure designed to stop the tooth at the crest. When the tow bar is being used, the inner member's movement within the confines of the outer member exposes the tow bar to damage and possibly to the detachment of a vehicle being towed from the towing vehicle.

The '042 reference also discloses an embodiment where the inner and outer members are secured by a pin attached on the outer member. The pin is adapted to insert through an opening defined by the inner member, thereby interlocking the inner and outer members. The problem with using a pin as a locking mechanism is that it might break, especially when towing a heavy load.

Another problem with the '042 reference is that high friction builds in between the pin and the opening or in between the latch and the dimple when a vehicle is being towed. Because of this high friction, a user may not be able to remove the pin from the hole or the latch from the dimple when the user wants to slide the inner member within the outer member to, for example, store the tow bar. This situation is commonly known in the art as being in a "bind." To get out of the bind, the user would have to re-board the towing vehicle and drive the towing vehicle back and forth until the friction is relieved off the pin. Driving the towing vehicle back and forth may not even remove the bind, especially when the towing vehicle and the vehicle being towed are on an uphill surface.

Another tow bar is disclosed in U.S. Pat. No. 5,957,477 ('477 reference). The '477 reference has two leg members that are attached by a slideable collar, which moves between a locked and an unlocked position. Each leg member has an inner member that has grooves and an outer member that has catches. The catches attach to the grooves when the collar is in a locked position, thereby interlocking both members. Like the tow bar previously described, the catches might disengage from the grooves, especially when towing a heavy load.

The '477 reference is also susceptible to "binding." In fact, the '477 reference provides a separate release tool for a user to remove an inner bar that is "bound" with the outer bar. Thus, a tow bar that has little or no tendency to "bind" is desired. Additionally, a tow bar that has an integrated tool for releasing "bound" members is also desired because separate tools are easy to lose and are complicated to use.

BRIEF SUMMARY OF THE ASPECTS OF THE INVENTION

The applicant has therefore provided an interlocking device. In the preferred embodiment, the interlocking device has an inner bar, which has a confined end disposed within the confines of an outer bar. A plug is attached to the confined end of the inner bar. The inner bar is slideable within the confines of an outer bar. The outer bar has a first end and a second end. A plug barrier is attached to the second end. When the inner bar slides towards the second end of the outer bar, the plug is adapted to abut the plug barrier thereby preventing the inner bar from sliding towards the second end.

The interlocking device further has an interlocking member attached to the plug by a bolt. When the plug abuts the plug barrier, at least a portion of the interlocking member moves transverse from the sliding axis of the inner bar. The interlocking member inserts through an interlocking member passage, which is preferably defined by the top wall of the outer bar. The interlocking locking member further abuts an interlocking member stop, which is also preferably defined by the top wall of the outer bar. The inner bar is stopped from sliding towards the first end of the outer bar by the interlocking member and the interlocking member stop, and the inner bar is also stopped from sliding towards the second end of the outer bar by the plug and the plug barrier.

The interlocking device preferably has a cam attached to the outer bar and adjacent to the interlocking member stop. The cam may be actuated to release the interlocking member from the interlocking member stop thereby allowing the inner bar to slide through the confines of the outer bar.

Additional features of certain embodiments of the invention will further be described below. It is to be understood that the invention is not limited in its application to the details of the construction and to the arrangement of the components set forth in the following description or as illustrated in the drawings. The invention is capable of other embodiments and of being practiced and carried out in various ways. Finally, it is understood that the scope of the present invention is to be determined by reference to the issued claims and not by whether a given embodiment meets every aspect of this brief summary or satisfies every deficiency or problem with the prior art as noted above.

BRIEF DESCRIPTION OF THE DRAWINGS

Certain embodiments of the invention are shown in the following drawings where:

FIG. 2 is substantially a longitudinal cross-sectional view of an embodiment of the interlocking device wherein the inner bar is in a locked position within the outer bar.

FIG. 3A is substantially a longitudinal cross-sectional view of an embodiment of the interlocking device wherein the inner bar is in an unlocked position within the outer bar.

FIG. 3B is substantially an enlarged view of the cam area of the embodiment depicted in FIG. 3A.

DESCRIPTION OF THE PREFERRED EMBODIMENTS

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
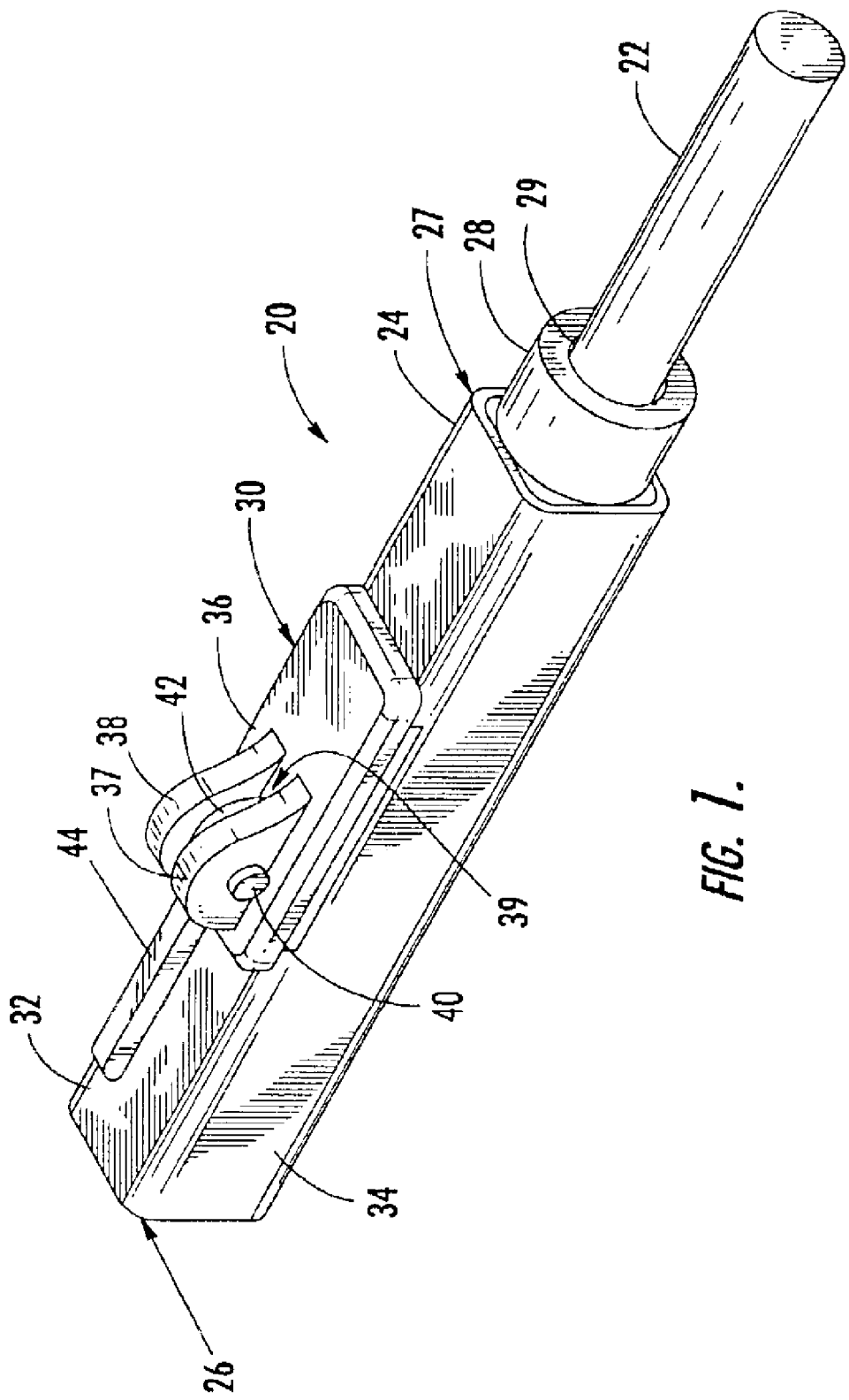
FIG. 1 is substantially a perspective view of an embodiment of the interlocking device.

Referring now to FIG. 1, the preferred embodiment of an interlocking device 20 is shown. Interlocking device 20 has an outer bar 24 and an inner bar 22. Outer bar 24 is preferably formed from a plurality of interconnected walls (only 32 and 34 are shown). The plurality of interconnected walls preferably define a rectangle-shaped outer bar and a square-shaped cross-section. The interconnected walls define a cavity within the outer bar, which is referred to as the confines of the outer bar. Alternatively, outer bar 24 may be formed from a hollow cylindrical tube.

Outer bar 24 has a first end 26 and a second end 27. Second end 27 is also referred to as the receiving end. Outer bar 24 preferably has a collar 28 attached to receiving end 27. Collar 28 is preferably cylindrical in shape. Collar 28 defines an inner bar passage 29. In an embodiment without a collar, inner bar passage 29 may be defined by the plurality of interconnected walls at receiving end 27.

Inner bar 22 enters the confines of the outer bar 24 through inner bar passage 29 and is slidable within the confines of outer bar 24. Inner bar movement from receiving end 27 and first end 26 defines a sliding axis. Inner bar 22 is preferably in a sliding fit relative to inner bar passage 29. The term sliding fit is used to refer to a configuration between members wherein a moving member has little or no room to deviate from the axis of movement. Thus, inner bar 22 preferably has little or no room to deviate from its sliding axis. The sliding fit configuration minimizes the generation of friction in the moving member, which may result in the moving member being difficult or impossible to move, or place the moving member in a "bind." Inner bar 22 is preferably cylindrical in shape, but may be rectangular, triangular, or other shapes known in the art. Inner bar 22 is preferably made of steel, but may also be made of plastic, polymer, wood, or other materials known in the art.

With continued reference to FIG. 1, outer bar 24 has a cam mount 30 attached to one of the interconnected walls, preferably top wall 32. Cam mount 30 may be attached in between receiving end 27 and first end 26, preferably adjacent to receiving end 27. Cam mount 30 has a base 36 and a bolt holder 38. Bolt holder 38 preferably has two humps 37 positioned side-by-side. A channel 39 is formed in between humps 37. Humps 37 are adapted to attach a bolt 40 in between channel 39. Bolt 40 is adapted to rotatably attach a cam 42. Cam 42 rotates within cam opening (not shown) defined by base 36 of cam mount 30. Cam 42 preferably has an elongated handle 44. Elongated handle 44 may be attached to cam 42 or may be built unitarily with cam 42. Elongated handle 44 is preferably movable from 0 degrees to 180 degrees and within a rotational plane to actuate cam 42.

Outer bar 24 and collar 28 are preferably made of steel, but may also be made of plastic, polymers, wood, or other materials known in the art. Outer bar 24 and collar 28 may have different shapes, such as cylindrical, triangular, or other shapes known in the art. Outer bar 24 and collar 28 may be attached together preferably by welding, or by using adhesives or fasteners known in the art. Outer bar 24 and collar 28 may also be built unitarily, such as by molding.

Referring now to FIG. 2, inner bar 22 has a first end 62 and a second end 64. Second end 64 is preferably disposed inside the confines of outer bar 24. Second end 64 is also referred to as the confined end. A plug 66 is attached to confined end 64 of inner bar 22. A plug barrier 67 adapted to abut plug 66 is attached to outer bar 24 adjacent to or at receiving end 27. In the preferred embodiment, plug barrier 67 may be a bushing attached to outer bar 24. Bushing may define an opening (not shown in FIG. 2) continuous with inner bar passage 29. The diameter of the opening may be smaller than the plug diameter so that plug 66 can abut the bushing. In an alternative embodiment, plug barrier 67 may be collar 28 having a diameter smaller than the diameter of plug 66 so that plug 66 can abut collar 28. In yet another embodiment, plug barrier 67 may be receiving end 27 that defined inner bar passage 29. Receiving end 27 may have defined inner bar passage 29 with a diameter smaller than plug 66 so that plug 66 can abut inner bar passage 29.

When inner bar 22 slides in the direction towards receiving end 27, plug 66 eventually abuts a plug barrier 67. Plug 66 and plug barrier 67 therefore stop inner bar 22 from further sliding towards receiving end 27 and from detaching from outer bar 24. In the preferred embodiment, plug barrier 67 is preferably made of steel, but may be made of other materials known in the art, such as plastic, rubber, polymer, wood, and the like. Plug 66 is preferably shaped like inner bar 22, but has a larger diameter than inner bar 22. Of course, plug 66 may be of various shapes. Plug 66 is preferably in a sliding fit relative to outer bar 24. Inner bar 22 is also preferably in a sliding fit relative to plug barrier 67.

In the preferred embodiment, a bolt 70 attaches a block 72 to plug 66. Bolt 70 may also attach block to confined end 64 of inner bar 22. Bolt 70 is preferably disposed parallel to the sliding axis of the inner bar and substantially in between top wall 32 and bottom wall of outer bar 24 so that bolt 70 slides with inner bar in the sliding axis. Block 72 preferably extends over bolt 70, and portion of block 72 preferably defines a dome surrounding a portion of bolt 70. Cross-section of block 72 preferably tapers from bottom to top, so as to form a wedge-shaped structure.

Block 72 is movable from a first position where block 72 is substantially parallel to the sliding axis of inner bar 22 to a second position where block 72 moves transverse from the sliding axis of inner bar 22. In the preferred embodiment, a biasing device 74, such as a spring, is placed around bolt 70. When block 72 is moved to the second position, biasing device 74 moves block 72 transverse from the sliding axis of inner bar 22, and preferably the edge of the wedge goes into block passage 76. Block passage 76 may be an opening defined by top wall 32. Top wall 32 preferably define block stop 78. Block stop 78 may also be defined by cam mount base 36. Block stop 78 abuts the edge of the wedge. Thus, block 72 and block stop 78 prevent inner bar 22 from further sliding in the direction towards first end 26 of outer bar 24.

It can thus be seen from FIG. 2 that a positive mechanical interlock locks inner bar 22 within the confines of outer bar 24. Inner bar 22 cannot slide further in the direction towards second end 27 of outer bar. Inner bar 22 also cannot slide in the direction towards first end 26 of outer bar. Thus, it can be seen that, unlike friction-based locks disclosed in prior art, virtually no amount of force or pressure applied in the direction of the sliding axis of inner bar 22 can cause inner bar 22 to slide, unless components interlocking inner bar 22 with outer bar 24 are destroyed.

Referring now to FIG. 3A, cam mount 30 and cam 42 are preferably positioned adjacent to block passage 76. Cam 42 may be actuated by rotating cam handle 42 within its rotational axis. Cam 42 pushes block 72 against biasing pressure of biasing device 74 until block 72 is released from block passage 76 and block stop 78. Once block 72 is released, inner bar 22 may slide in the direction towards first end 26 of outer bar 24. A close up view of the cam area, the area around cam 42, is shown in FIG 3B.

It is noted that the portion of block 72, which does not insert through block passage 76, is preferably sized to provide a sliding fit between said portion and the outer bar. Thus, block 72 has protrusion 83 reflecting the change in the block size from the portion of the block that inserts through the block passage to the portion of the block that is preferably sized to provide the sliding fit. As discussed above, the sliding fit feature helps prevent inner bar 22 from deviating from its sliding axis.

Figure 4:
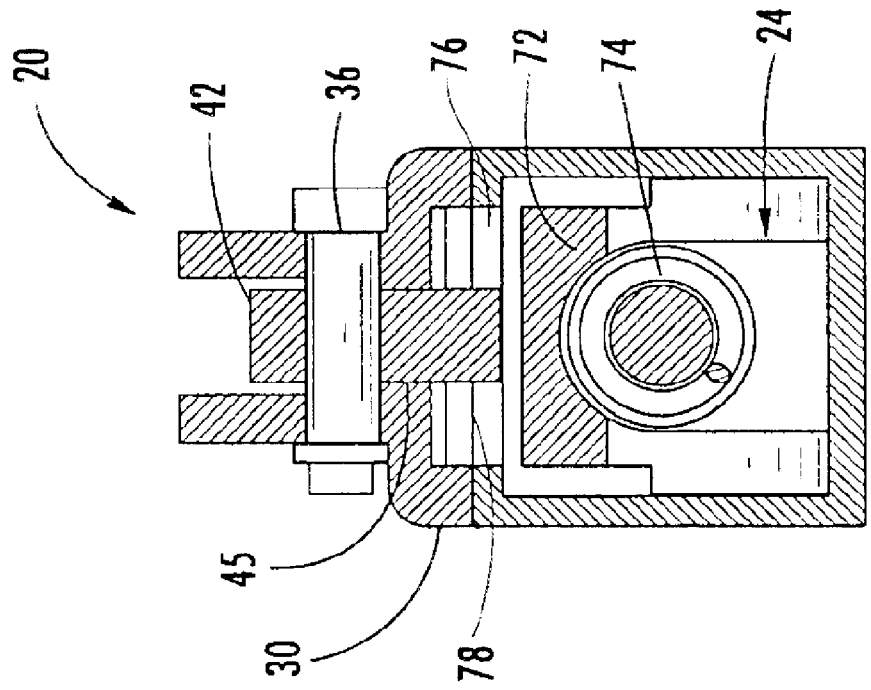
FIG. 4 is substantially a cross-sectional view taken from line 4—4 shown in FIG. 3A.

Referring now to FIG. 4, a cross-sectional view of interlocking device 20 is shown wherein inner bar 22 (shown in FIGS. 1–3) is locked from sliding within the confines of the outer bar. Block 76 (shown in FIGS. 1–3) has moved to the second position where it is transverse from the sliding axis of inner bar 22. Biasing device 74 is further shown to be parallel with the sliding axis of inner bar 22 so that biasing device 74 is adapted to move with inner bar 22.

Figure 5:
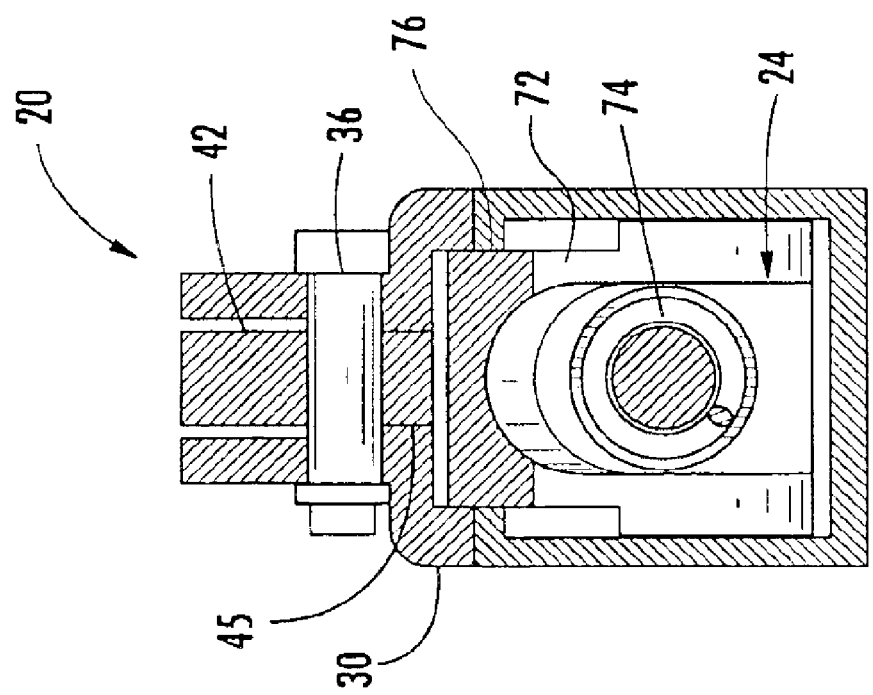
FIG. 5 is substantially a cross-sectional view taken from line 5—5 shown in FIG. 2.

Referring now to FIG. 5, a cross-sectional view of interlocking device 20 is shown wherein cam 42 is actuated to release block 72 from block stop 78. When cam 42 is actuated, cam 42 rotates with cam opening 45. A portion of cam 42 further extends through cam mount 30, block passage 76, and the confines of outer bar 24, thereby pushing block 72 against biasing device 74 to release block 72 from block stop 78. Once block 72 is released from block stop 78, inner bar 22 may slide in the direction towards first end 26 of outer bar 24.

It can thus be seen from FIGS. 2, 4, and 5 that while interlocking device 20 provides a positive mechanical interlock between inner bar 22 and outer bar 24, interlocking device 20 also allows a user to conveniently unlock the positive mechanical interlock by simply rotating cam handle 44.

Figure 6:
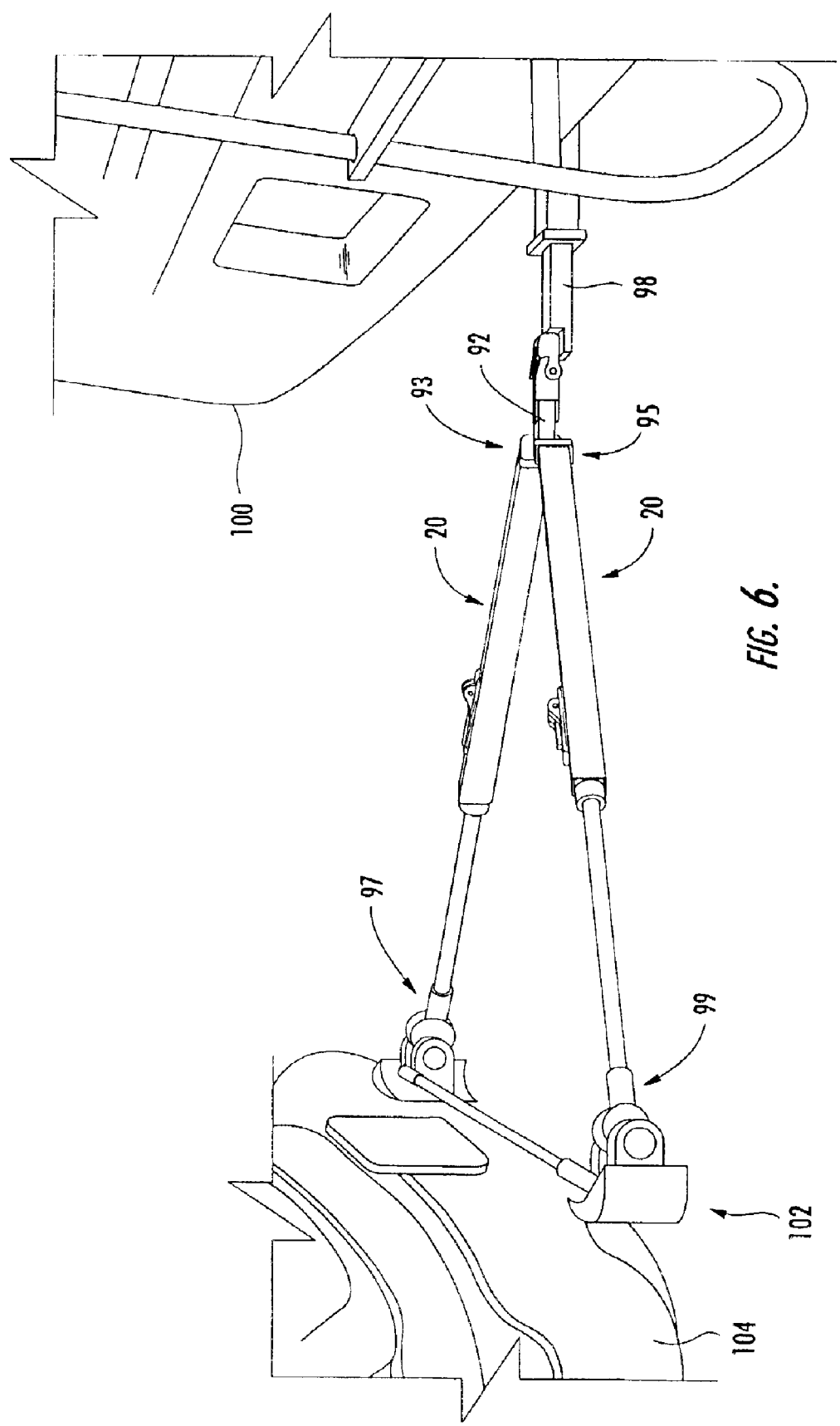
FIG. 6 shows an embodiment of the interlocking device being used as tow bar legs for a tow bar system.

Referring now to FIG. 6, the preferred environment of use for interlocking device 20 is shown wherein interlocking device 20 is used for a tow bar system. A tow bar system may have one tow bar leg or a plurality of tow bar legs. In the most preferred embodiment, interlocking device 20 is used as tow bar legs for a tow bar system having two tow bar legs. Each tow bar leg has an outer bar end 93 and 95 and an inner bar end 97 and 99. Outer bar ends 93 and 95 attach to a leg coupler 92 in substantially a y-shaped configuration. Leg coupler 92 attaches to a connecting bar 98, which attaches to a towing carrier 100. Inner bar ends 97 and 99 attach to a base assembly 102. Base assembly 102 attach to a carrier being towed 104. Base assembly 102, leg coupler 92, and connector 98 are well known in the art.

It can thus be seen that when certain embodiments of interlocking device 20 are used as a tow bar leg, interlocking device 20 provides a tow bar leg that has an inner bar mechanically interlocked with an outer bar. This positive mechanical interlock minimizes the risk of the inner bar detaching from the outer bar as the inner bar is stopped from sliding at one end by the plug and the plug barrier and from sliding at the other end by the block and the block stop. Thus, the positive mechanical interlock minimizes the chances for a vehicle being towed to separate from the towing vehicle.

Additionally, the sliding fit feature of some of the components of interlocking device 20 help prevent the inner bar from being misaligned within the confines of the outer bar. This feature allows interlocking device 20 to avoid the instance where, especially during disassembly and storage of the tow bar, the inner bar becomes difficult or impossible to slide within the outer bar because of friction. Interlocking device 20 further allows a user to conveniently unlock the inner bar interlocked with the outer bar by simply actuating a cam. This feature is especially helpful in contracting the size of the tow bar for storage.

Besides being used as tow bar legs, it should be appreciated that interlocking device 20 may also be used for devices using inner and outer members. Additionally, interlocking device 20 may be used for devices wherein the ability to adjust the devices' dimensions is a desired feature. As examples, interlocking device 20 may be used for construction devices that extend to a certain height to transport and allow a person to work on an elevated area, such as billboards. Interlocking device 20 may also be used for camera tripods, surveying equipment, cleaning equipment, and agricultural tools. Interlocking device 20 may further be used for support devices that have adjustable legs. When interlocking device 20 is used in the above applications, interlocking device 20 offers a sturdy positive mechanical interlock between members, a "bindless" inner and outer bar, and a convenient locking mechanism.

CONCLUSION

Although the description above contains many specifications, these should not be construed as limiting the scope of the invention but as merely providing illustrations of some of presently preferred embodiments of this invention. Thus, the scope of the invention should be determined by the issued claims and their legal equivalents rather than by the examples given.

What is claimed is:

1. A tow bar system comprising:
   (A) a leg coupler; and
   (B) at least one tow bar leg attached to the leg coupler, the tow bar leg comprising:
      (a) an outer bar, the outer bar having a first end and a second end, the second end defining an inner bar passage, the outer bar substantially defining a block passage and a block stop;
      (b) an inner bar passing through the inner bar passage, at least a portion of the inner bar being slidable and disposed within the confines of the outer bar;
      (c) a plug barrier attached to the outer bar;
      (d) a plug attached to the inner bar, the plug being adapted to abut the plug barrier thereby stopping the inner bar from sliding towards the second end of the outer bar;
      (e) a block attached to the inner bar, the block being transversely movable relative to a sliding axis of the inner bar, the block being adapted to abut the block stop thereby preventing the inner bar from sliding towards the first end of the outer bar, at least a portion of the block is in a sliding fit relative to the outer bar; and
      (f) a cam attached to the outer bar and adjacent to the block stop, the cam being adapted to release the block from the block stop thereby allowing the inner bar to slide through the outer bar.

2. The tow bar system of 1, wherein the plug barrier comprises a collar attached to the second end of the outer bar, and wherein the collar further defines the inner bar passage.

3. The tow bar system of claim 2, wherein the inner bar is in a sliding fit relative to the collar.

4. The tow bar system of claim 2, wherein the inner bar is in a sliding fit relative to the bushing.

5. The tow bar system of claim 1, wherein the plug barrier further comprises a bushing attached to the confines of the outer bar.

6. The tow bar system of claim 1, further comprising a cam handle attached to the cam, whereby the cam handle allows a user to actuate the cam.

7. The tow bar system of claim 1, further comprising a cam mount attached to the outer bar and adjacent to the block passage.

8. The tow bar system of claim 1, wherein the block stop and the cam are positioned on top of the outer bar.

9. The tow bar system of claim 1, further comprising a cam passage, the cam being adapted to pass through the cam passage, whereby the cam passage guides the cam to rotate within a rotational axis.

10. The tow bar system of claim 1, wherein the block is attached in between a biasing element and the inner bar, the biasing element being adapted to move the block transversely relative to a sliding axis of the inner bar.

11. The tow bar system of claim 10, wherein the biasing element is positioned parallel to the sliding axis of the inner bar, the biasing element being adapted to slide with the inner bar when the inner bar slides through its sliding axis.

12. The tow bar system of claim 1, wherein the plug is in a sliding fit relative to the outer bar.

13. The tow bar system of claim 1, wherein the plug is in a sliding fit relative to the plug barrier.

14. A tow bar comprising:
   (A) an outer bar, the outer bar defining an interlocking member passage, the interlocking member passage comprising an interlocking member stop;
   (B) an inner bar, at least a portion of the inner bar being slidable and disposed within the confines of the outer bar; and
   (C) an interlocking member attached to the inner bar, the interlocking member comprising a biasing element, the biasing element being adapted to urge at least a portion of the interlocking member to move transverse from sliding axis of the inner bar thereby causing at least a portion of the interlocking member to be positioned inside the interlocking member passage and abut the interlocking member stop thereby preventing the inner bar from sliding towards at least one direction, wherein the biasing element is positioned parallel to the sliding axis of the inner bar, the biasing element being adapted to slide with the inner bar when the inner bar slides through its sliding axis.

15. The tow bar of claim 14, further comprising a plug associated with the inner bar and a plug barrier associated with the outer bar, the plug being adapted to abut the plug barrier to prevent the inner bar from sliding away from the outer bar.

16. The tow bar of claim 15, further comprising a cam handle attached to the cam, whereby the cam handle allows a user to actuate the cam.

17. The tow bar of claim 15, wherein the interlocking member stop and the cam are positioned on top of the outer bar.

18. The tow bar of claim 14, further comprising a cam attached to the outer bar and positioned adjacent to the interlocking member stop, wherein when the cam is actuated, the cam pushes the interlocking member away from the interlocking member stop thereby allowing the inner bar to slide.

19. The tow bar of claim 14, further comprising a collar attached to the outer bar, the collar defining an inner bar passage, wherein the inner bar passes through the inner bar passage and the inner bar is slideable within the confines of the outer bar.

20. The tow bar of claim 19, further comprising a plug attached to the inner bar, the plug being adapted to abut the collar to prevent the inner bar from sliding away from the outer bar.

21. The tow bar of claim 14, further comprising:
(A) a bushing attached to the confines of the outer bar; and
(B) a plug associated with the inner bar, the plug being adapted to abut the bushing to prevent the inner bar from sliding away from the outer bar.

22. The tow bar of claim 21, wherein the inner bar is in a sliding fit relative to the bushing.

23. The tow bar of claim 14, wherein at least a portion of the interlocking member is in a sliding fit relative to the outer bar.

24. The tow bar of claim 14, further comprising a cam passage, the cam being adapted to pass through the cam passage and extend to the confines of the outer bar.

25. An interlocking towbar device for an inner bar slidable within confines of an outer bar, the interlocking towbar device comprising:
(A) a plug attached to the inner bar;
(B) a means for abutting the plug thereby stopping the inner bar from sliding to at least one direction;
(C) a block passage defined by the outer bar, the block passage comprising a block stop;
(D) a block attached to the inner bar, the block being transversely movable from the sliding axis of the inner bar, the block being adapted to abut the block stop thereby preventing the inner bar from sliding; and
(E) a biasing element attached to the block, wherein the biasing element is adapted to move at least a portion of the block transversely from the sliding axis of the inner bar and through an interlocking member passage.

26. The interlocking towbar device of claim 25, wherein the means for abutting the plug comprises a collar attached to the outer bar, the collar having a diameter less than the plug.

27. The interlocking towbar device of claim 25, wherein the means for abutting the plug comprises a bushing attached to the outer bar.

28. The interlocking towbar device of claim 25, wherein the means for abutting the plug comprises a plug barrier defined by an outer bar end.

29. The interlocking towbar device of claim 25, wherein the inner bar and outer bar comprises a part of a tow bar for use in towing a carrier.

30. The interlocking towbar device of claim 25, further comprising a cam attached to the outer bar and adjacent to the block stop, the cam being adapted to release the block from the block stop thereby allowing the inner bar to slide through the confines of the outer bar.

31. The interlocking towbar device of claim 30, further comprising a cam mount attached to the outer bar, the cam mount comprising a base and a bolt holder, wherein the cam is rotatably attached to a bolt, the bolt being attached to the bolt holder.

32. The interlocking towbar device of claim 30, further comprising a cam handle attached to the cam, whereby the cam handle allows a user to actuate the cam.

33. The interlocking towbar device of claim 30, wherein the block stop and the cam are positioned on top of the outer bar.

34. The interlocking towbar device of claim 31, wherein the base defines a cam passage, the cam being adapted to pass through the cam passage, wherein at least a portion of the cam extends to the confines of the outer bar.

35. The interlocking towbar device of claim 25, wherein the biasing element is positioned parallel to the sliding axis of the inner bar, whereby when the inner bar slides, the biasing element slides with the inner bar.

36. The interlocking towbar device of claim 25, wherein the inner bar is in a sliding fit relative to the means for abutting the plug.

37. The interlocking towbar device of claim 25, wherein at least a portion of the block is in a sliding fit relative to the outer bar.

38. A tow bar comprising:
(A) an outer bar, the outer bar comprising a first end and a second end;
(B) an inner bar, at least a portion of the inner bar being slidable and disposed within the confines of the outer bar;
(C) a first stopping means for stopping the inner bar from sliding towards the second end of the outer bar; and
(D) a second stopping means, slidable with the inner bar, for stopping the inner bar from sliding towards the first end of the outer bar; the second stopping means comprising an interlocking member slidable with the inner bar, at least a portion of the interlocking member being movable transverse from a sliding axis of the inner bar and through the interlocking member passage, the interlocking member being adapted to abut an interlocking member stop, thereby stopping the inner bar from sliding.

39. The tow bar of claim 38, wherein the outer bar defines the interlocking member passage and the interlocking member stop, the tow bar further comprising a releasing means for releasing the second stopping member attached to the outer bar and adjacent to the interlocking member stop, whereby when the cam is actuated, the releasing means is adapted to release the second stopping means from the interlocking member stop thereby allowing the inner bar to slide within the confines of the outer bar.

40. The tow bar of claim 39, wherein the interlocking member stop and the releasing means are positioned on top of the outer bar.

41. The tow bar of claim 38, further comprising a biasing means attached to second stopping means, the biasing means being adapted to move the second stopping means transverse from a sliding axis of the inner bar.

42. The tow bar of claim 41, wherein the biasing means is positioned parallel to the sliding axis of the inner bar, the biasing means being adapted to slide with the inner bar when the inner bar slides within the confines of the outer bar.

43. The tow bar of claim 38, wherein the first stopping means comprises a plug associated with the inner bar and a bushing attached to the confines of the outer bar, wherein when the inner bar slides towards the second end of the outer bar, the plug is adapted to abut the bushing.

44. The tow bar of claim 43, wherein the inner bar is in a sliding fit relative to the bushing.

45. The tow bar of claim 38, wherein at least a portion of the second stopping means is in a sliding fit relative to the outer bar.

* * * * *